(12) United States Patent
Trost et al.

(10) Patent No.: US 11,568,209 B2
(45) Date of Patent: Jan. 31, 2023

(54) USING DEEP LEARNING MODELS TO OBFUSCATE AND OPTIMIZE COMMUNICATIONS

(71) Applicant: AT&T Intellectual Property I, L.P., Atlanta, GA (US)

(72) Inventors: William R. Trost, Mequon, WI (US); Daniel Solero, Rockwall, TX (US); Brian Miles, Pittsboro, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 426 days.

(21) Appl. No.: 16/792,998

(22) Filed: Feb. 18, 2020

(65) Prior Publication Data
US 2021/0256352 A1    Aug. 19, 2021

(51) Int. Cl.
*G06N 3/04*  (2006.01)
*G06F 9/54*  (2006.01)
*G06N 3/08*  (2006.01)

(52) U.S. Cl.
CPC ............ *G06N 3/0454* (2013.01); *G06F 9/54* (2013.01); *G06N 3/08* (2013.01)

(58) Field of Classification Search
None
See application file for complete search history.

(56) References Cited

U.S. PATENT DOCUMENTS 10,755,212 B2 *  8/2020  Dyer .............. G06Q 10/063118
2016/0012350 A1 *  1/2016  Narayanan ........... G06F 9/4484
706/12

* cited by examiner

*Primary Examiner* — Chat C Do
*Assistant Examiner* — William C Wood
(74) *Attorney, Agent, or Firm* — Hartman & Citrin LLC

(57) ABSTRACT

Concepts and technologies are disclosed herein for using deep learning models to obfuscate and optimize communications. A request can be received in a first language, from a user device, and at a first computing device storing a first neural network. The request can be translated using the first neural network into a modified request in a custom language. The modified request can be sent to a second computing device hosting an application. The first computing device can receive a modified response that is in the custom language, where the modified response can be created at the second computing device using the second neural network and based on a response from the application. The modified response can be translated into a response in the first language and sent to the user device.

20 Claims, 8 Drawing Sheets

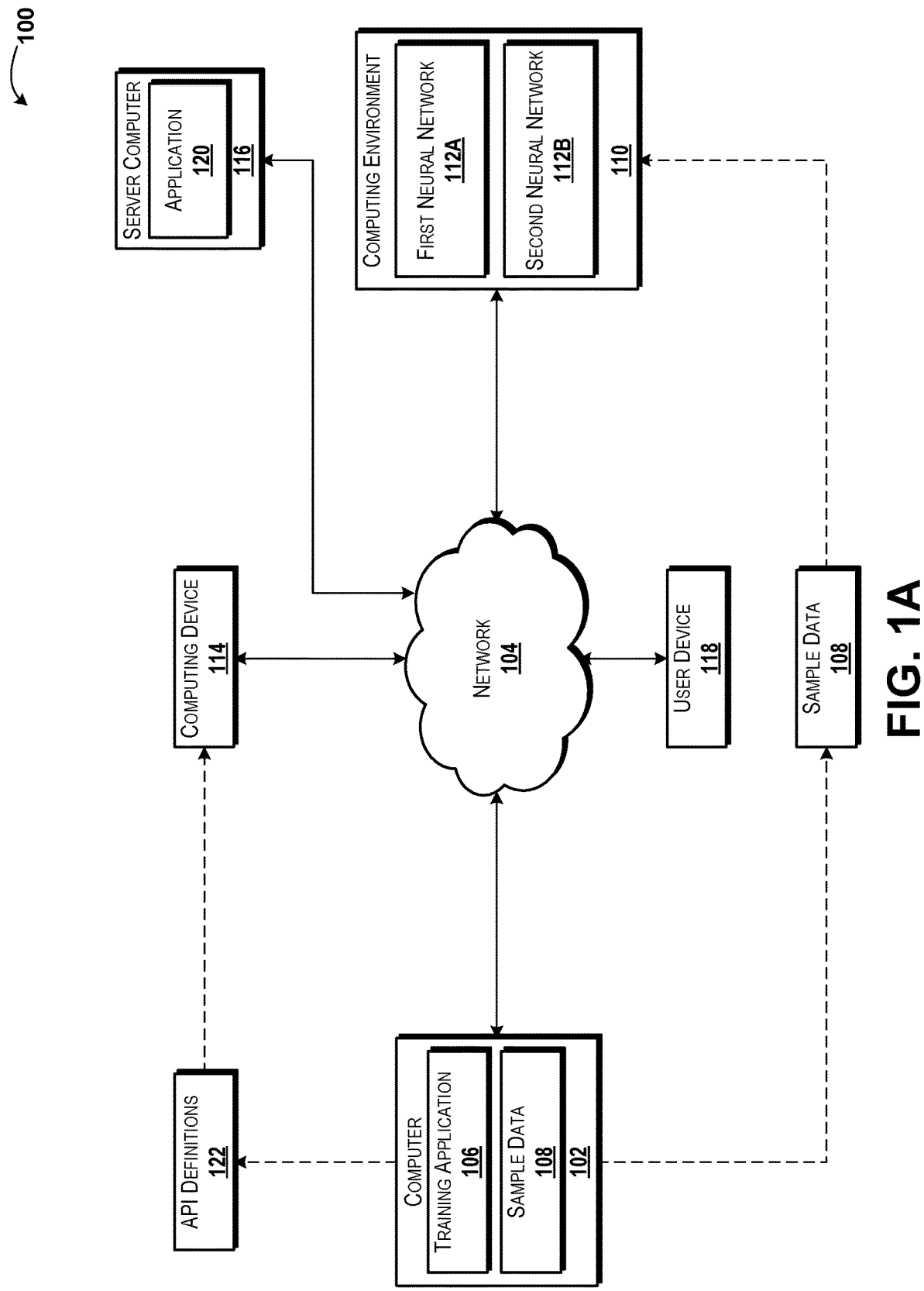

USING DEEP LEARNING MODELS TO OBFUSCATE AND OPTIMIZE COMMUNICATIONS

BACKGROUND

With the rapid growth of data-based networks in the United States and abroad, the usefulness and pervasiveness of data (obtained from data-based networks) has increased dramatically. "Big data" involves the compilation of data from one or more sources and the use of the data to learn about the subject of that data. For example, a network user's purchasing history, movements, and/or other information may be collected from various sources and used to learn about that user.

Additionally, the exchange of sensitive information in digital format has become commonplace. In modern networks, traffic associated with the most sensitive of topics may traverse networks along with relatively mundane data. For example, sensitive health information, financial information, and/or other information may traverse a network with social media messages, and the like. To protect sensitive information from interception and/or other unauthorized access, encryption or other security techniques sometimes may be used to protect information.

As the world attempts to enter the quantum computing age, however, the ability to access encrypted information without authorization may soon be a reality. In particular, some encryption techniques rely on the inability of others to "crack the code" to protect information. As quantum computing becomes a reality, computers may soon be able to defeat such technologies rapidly and the failure of such technologies therefore may become commonplace.

As a result, traditional data protection technologies may be approaching the end of their useful lives, with future data protection technologies being needed to protect data from unauthorized use and/or disclosure.

SUMMARY

The present disclosure is directed to using deep learning models to obfuscate and optimize communications. A training application can pass a set of sample data to two or more neural networks, for example in a computing environment. The sample data can correspond to a set of requests and responses and can be used to train the neural networks to create a custom language for communicating with one another to pass information for requests and responses. In some embodiments, the sample data can include an initialization vector to help obscure the protocol that is to be developed by the neural networks. The training application also can send a set of application programming interface ("API") definitions to a computing device or other device as illustrated and described herein. The computing device can create an API using the API definitions, where the API can be called by a requestor (e.g., the user device) to create a request for an application.

Once trained, the neural networks can be deployed to two or more devices that are to communicate with one another to create a request for the application and to obtain a response from the application. In one contemplated embodiment, a first neural network can be deployed to a computing device and a second neural network can be deployed to a server computer that can host the application. It should be understood that this example is illustrative, and therefore should not be construed as being limiting in any way.

A device (e.g., the user device) can create a request via interactions with the API of the computing device. The computing device can receive the request, translate the request into a custom language developed by the neural networks, and pass the modified request to the server computer that hosts the application. The server computer can receive the modified request, translate the modified request into the request or an equivalent application call using the second neural network, and pass the application call to the application. The application can output a response from the application, the second neural network can translate the response into a modified response, and the server computer can send the modified response to the computing device.

The computing device can receive the modified response, translate the modified response into the response using the first neural network, and provide the response to the requestor (e.g., the user device). Thus, it can be appreciated that the user device can create the request and receive the response without any other devices between the computing device and the server computer obtaining the request and/or the response. In various embodiments, the neural networks can be configured to evolve the custom language during use of the custom language to improve security or for other reasons. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving, at a first computing device that stores a first neural network, a request for an operation to be performed by an application that can be executed by a second computing device. The request can be in a first language, and the request can be received from a user device. The operations further can include translating, at the first computing device and using the first neural network, the request into a modified request in a custom language. The first neural network and a second neural network can be trained to communicate with one another in the custom language.

The custom language can be created by the first neural network and the second neural network. The operations further can include sending, by the first computing device and to the second computing device, the modified request in the custom language; and receiving, by the first computing device and from the second computing device, a modified response that can be in the custom language. The modified response can be created at the second computing device using the second neural network. The operations also can include translating, by the first computing device and using the first neural network, the modified response into a response in the first language; and sending, by the first computing device and to the user device, the response in the first language.

In some embodiments, the request for the operation can be received via an application programming interface that can be exposed by the first computing device. In some embodiments, the modified request can be sent to the second computing device via the application programming interface. In some embodiments, the first neural network and the second neural network can create the custom language using sample data provided by a training application. The sample data can include requests and responses associated with the application, and the first neural network and the second neural network create the custom language based on a structure of the requests and the responses.

In some embodiments, the request for the operation can be received via an application programming interface that can be exposed by the first computing device, and the training application can provide a set of application programming interface definitions to the first computing device. The application programming interface can be based on the application programming interface definitions.

In some embodiments, the first neural network can be deployed to the first computing device after the first neural network is trained to communicate using the custom language, and the second neural network can be deployed to the second computing device after the second neural network is trained to communicate using the custom language. In some embodiments, the second computing device receives the modified request, translates the modified request into an application call using the second neural network, passes the application call to the application, receives an application response from the application, and translates the application response into the modified response using the second neural network. In some embodiments, the modified request and the modified response obfuscate contents of the request for the operation and contents of the response.

According to another aspect, a method is disclosed. The method can include receiving, at a first computing device that stores a first neural network, a request for an operation to be performed by an application that can be executed by a second computing device. The request can be in a first language, and the request can be received from a user device. The method further can include translating, at the first computing device and using the first neural network, the request into a modified request in a custom language. The first neural network and a second neural network can be trained to communicate with one another in the custom language.

The custom language can be created by the first neural network and the second neural network. The method further can include sending, by the first computing device and to the second computing device, the modified request in the custom language; and receiving, by the first computing device and from the second computing device, a modified response that can be in the custom language. The modified response can be created at the second computing device using the second neural network. The method also can include translating, by the first computing device and using the first neural network, the modified response into a response in the first language; and sending, by the first computing device and to the user device, the response in the first language.

In some embodiments, the first neural network and the second neural network can create the custom language using sample data provided by a training application. The sample data can include requests and responses associated with the application. The first neural network and the second neural network can create the custom language based on a structure of the requests and the responses. In some embodiments, the request for the operation can be received via an application programming interface that can be exposed by the first computing device. The training application can provide a set of application programming interface definitions to the first computing device, and the application programming interface can be based on the application programming interface definitions.

In some embodiments, the first neural network can be deployed to the first computing device after the first neural network is trained to communicate using the custom language. The second neural network can be deployed to the second computing device after the second neural network is trained to communicate using the custom language. In some embodiments, the second computing device receives the modified request, translates the modified request into an application call using the second neural network, passes the application call to the application, receives an application response from the application, and translates the application response into the modified response using the second neural network.

According to yet another aspect of the concepts and technologies disclosed herein, a computer storage medium is disclosed. The computer storage medium can store computer-executable instructions that, when executed by a processor, cause the processor to perform operations. The operations can include receiving, at a first computing device that stores a first neural network, a request for an operation to be performed by an application that can be executed by a second computing device. The request can be in a first language, and the request can be received from a user device. The operations further can include translating, at the first computing device and using the first neural network, the request into a modified request in a custom language. The first neural network and a second neural network can be trained to communicate with one another in the custom language.

The custom language can be created by the first neural network and the second neural network. The operations further can include sending, by the first computing device and to the second computing device, the modified request in the custom language; and receiving, by the first computing device and from the second computing device, a modified response that can be in the custom language. The modified response can be created at the second computing device using the second neural network. The operations also can include translating, by the first computing device and using the first neural network, the modified response into a response in the first language; and sending, by the first computing device and to the user device, the response in the first language.

In some embodiments, the request for the operation can be received via an application programming interface that can be exposed by the first computing device. In some embodiments, the first neural network and the second neural network can create the custom language using sample data provided by a training application. The sample data can include requests and responses associated with the application. The first neural network and the second neural network create the custom language based on a structure of the requests and the responses. In some embodiments, the request for the operation can be received via an application programming interface that can be exposed by the first computing device. The training application provides a set of application programming interface definitions to the first computing device, and the application programming interface can be based on the application programming interface definitions.

In some embodiments, the first neural network can be deployed to the first computing device after the first neural network is trained to communicate using the custom language. The second neural network can be deployed to the second computing device after the second neural network is trained to communicate using the custom language. In some embodiments, the second computing device receives the modified request, translates the modified request into an application call using the second neural network, passes the application call to the application, receives an application response from the application, and translates the application response into the modified response using the second neural network. In some embodiments, one of the modified request or the modified response can include data that communicates a change in the custom language.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIGS. 1A-1B are system diagrams illustrating an illustrative operating environment for various embodiments of the concepts and technologies described herein.

DETAILED DESCRIPTION

Figure 1B:
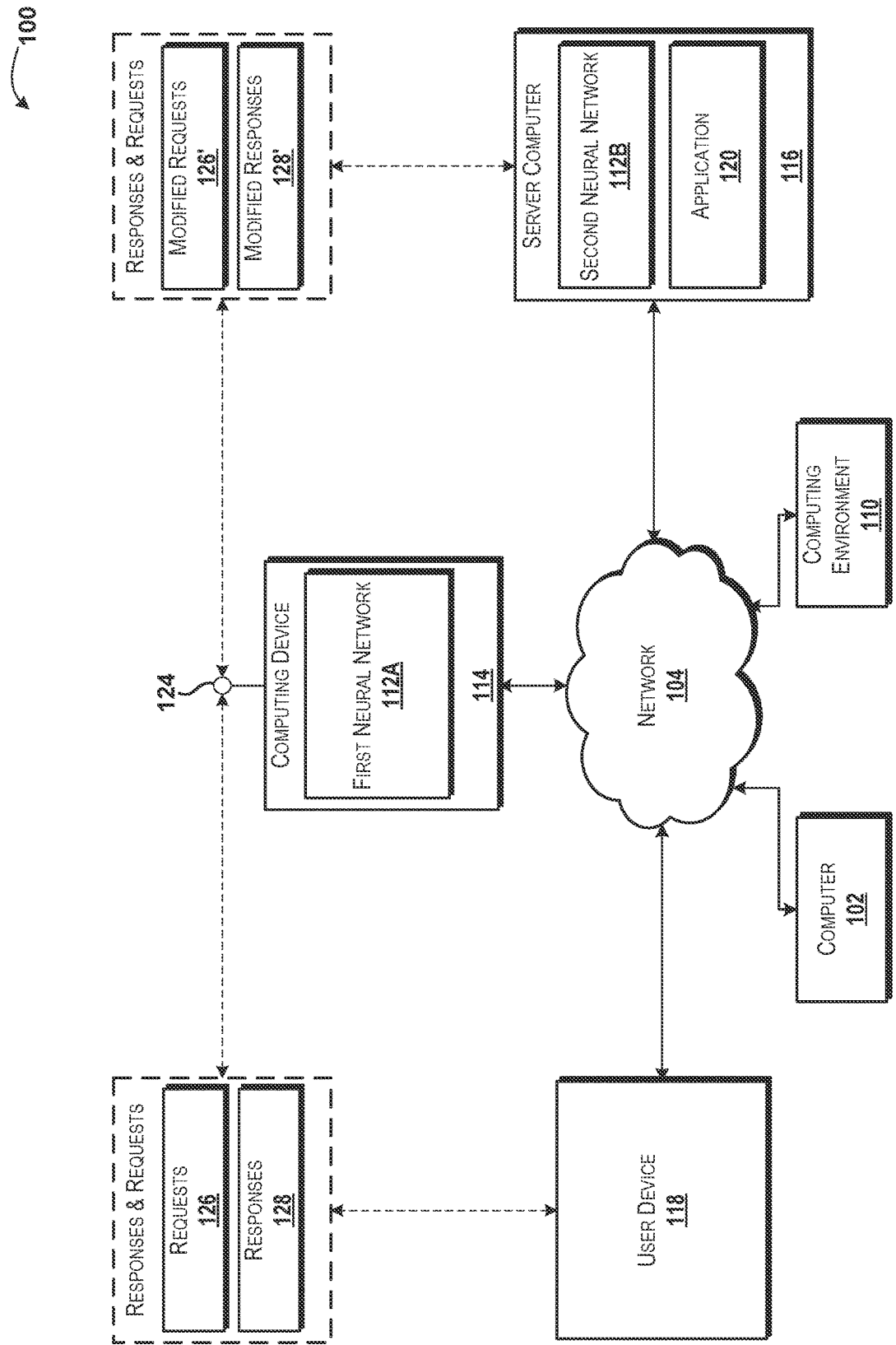

The following detailed description is directed to using deep learning models to obfuscate and optimize communications. A training application can pass a set of sample data to two or more neural networks, for example in a computing environment. In some embodiments, the sample data can include an initialization vector to help obscure the protocol that is to be developed by the neural networks. The sample data can correspond to a set of requests and responses and can be used to train the neural networks to create a custom language for communicating with one another to pass information for requests and responses. The training application also can send a set of API definitions to a computing device or other device as illustrated and described herein. The computing device can create an API using the API definitions, where the API can be called by a requestor (e.g., the user device) to create a request for an application.

Once trained, the neural networks can be deployed to two or more devices that are to communicate with one another to create a request for the application and to obtain a response from the application. In one contemplated embodiment, a first neural network can be deployed to a computing device and a second neural network can be deployed to a server computer that can host the application. It should be understood that this example is illustrative, and therefore should not be construed as being limiting in any way.

A device (e.g., the user device) can create a request via interactions with the API of the computing device. The computing device can receive the request, translate the request into a custom language developed by the neural networks, and pass the modified request to the server computer that hosts the application. The server computer can receive the modified request, translate the modified request into the request or an equivalent application call using the second neural network, and pass the application call to the application. The application can output a response from the application, the second neural network can translate the response into a modified response, and the server computer can send the modified response to the computing device.

The computing device can receive the modified response, translate the modified response into the response using the first neural network, and provide the response to the requestor (e.g., the user device). Thus, it can be appreciated that the user device can create the request and receive the response without any other devices between the computing device and the server computer obtaining the request and/or the response. In various embodiments, the neural networks can be configured to evolve the custom language during use of the custom language to improve security or for other reasons. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIGS. 1A-1B, aspects of an operating environment 100 for various embodiments of the concepts and technologies disclosed herein for using deep learning models to obfuscate and optimize communications will be described, according to an illustrative embodiment. The operating environment 100 shown in FIGS. 1A—1B includes a computer 102. The computer 102 can operate in communication with and/or as part of a communications network ("network") 104, though this is not necessarily the case.

According to various embodiments, the functionality of the computer 102 may be provided by one or more server computers, desktop computers, mobile telephones, laptop computers, other computing systems, and the like. It should be understood that the functionality of the computer 102 can be provided by a single device, by two similar devices, and/or by two or more dissimilar devices. For purposes of describing the concepts and technologies disclosed herein, the computer 102 is described herein as a server computer or a personal computer. It should be understood that this embodiment is illustrative, and should not be construed as being limiting in any way.

The computer 102 can execute an operating system (not shown in FIGS. 1A-1B) and one or more application programs such as, for example, a training application 106. The operating system can include a computer program for controlling the operation of the computer 102. The training application 106 can include an executable program that can be configured to execute on top of the operating system to provide various functions as illustrated and described herein. Although the training application 106 is illustrated as components of the computer 102, it should be understood that the training application 106 can be embodied as or in a stand-alone device or component thereof operating as part of or in communication with the network 104. As such, the illustrated embodiment should be understood as being illustrative of only some contemplated embodiments and should not be construed as being limiting in any way.

The computer 102 also can store sample data 108. The sample data 108 can correspond to one or more models and/or other information that can be used to train other devices and/or networks, as will be explained in more detail herein. According to some embodiments, the sample data 108 can include an initialization vector to other data that can be used by the neural networks 112 to further obscure the to-be-developed language or protocol. Thus, training of the neural networks 112 can include application of the initialization vector or other data to modify the protocol or custom language using some data other than just the structure of requests and/or responses. Thus, while not explicitly labeled in FIGS. 1A-1B, it should be understood that the sample data 108 can include an initialization vector and/or other data that can be used during the protocol or language development (training) phase. It should be understood that this example is illustrative, and therefore should not be construed as being limiting in any way.

According to various embodiments of the concepts and technologies disclosed herein, the computer 102 can communicate with a computing environment 110 that can be in communication with and/or operating as a part of the network 104. According to various embodiments of the concepts and technologies disclosed herein, the computing environment 110 can host two or more neural networks 112A-B (hereinafter collectively and/or generically referred to as "neural networks 112"). The two or more neural networks 112 can be substantially similar to one another, in some embodiments, or can be two or more types of neural networks 112.

As is known, neural networks such as the neural networks 112 shown in FIGS. 1A-1B can include one or more algorithms that can provide deep learning and/or artificial intelligence. According to various embodiments of the concepts and technologies disclosed herein, the neural networks 112 can be trained to create a protocol or language for communicating with one another. In particular, according to various embodiments of the concepts and technologies disclosed herein, the neural networks 112 can be trained by the training application 106 using the sample data 108 to create a new protocol or language for communicating with one another. This language developed by the neural networks 112 can be created by the neural networks 112 based on the sample data 108.

According to various embodiments of the concepts and technologies disclosed herein, one or more of the neural networks 112 can include a convolutional neural network such as a deep convolutional network. In some other embodiments, one or more of the neural networks 112 can include an auto encoder neural network, a sparse autoencoder neural network, a generative adversarial network, a deep belief neural network, or other types of neural networks. The two or more neural networks 112 of the operating environment 100 can communicate with one another using the sample data 108 to create a protocol or language for communicating with one another. In particular, the neural networks 112 can learn a structure and/or pattern associated with requests and/or responses as set forth in the sample data 108, and create a new protocol or language for communicating such requests and/or responses.

By way of example, the sample data 108 can include samples of requests associated with a particular service or application. The sample data 108 also can include samples of responses for the service or application, where the responses are responsive to the requests. By way of example, the sample data 108 can include a first request, a first response that was responsive to the first request, a second request, and a second response that was responsive to the second request. The sample data 108 can include tens, hundreds, thousands, tens of thousands, and/or more samples that can be provided to the neural networks 112.

The neural networks 112 can use the sample data 108 to learn the structure and/or pattern of requests and responses, and generate a new protocol or language based on the analysis. For purposes of illustrating and describing the concepts and technologies disclosed herein, the new language or protocol will be referred to herein as a "custom language." This terminology is used because in some embodiments of the concepts and technologies disclosed herein, the neural networks 112 can communicate with one another using the custom language, while other devices may be unable to decode the language to understand the requests and/or responses as the other devices have not been trained and therefore cannot understand the requests and/or responses.

Thus, various embodiments of the concepts and technologies disclosed herein can provide methodologies for obfuscating data in the requests and/or responses. Because the communicated responses and requests can be formatted in the custom language, devices that intercept or otherwise obtain the responses or requests in the custom language may believe the intercepted or otherwise obtained responses or requests to be noise or other inconsequential or meaningless data. It should be understood that this example is illustrative, and therefore should not be construed as being limiting in any way.

The training application 106 can be configured to send the sample data 108 to the computing environment 110 and/or otherwise to communicate the sample data 108 to the neural networks 112 for training of the neural networks 112. In some embodiments, the computer 102 can operate as a component of the computing environment 110. In some other embodiments, the computer 102 can access the computing environment 110 via a portal or other functionality that can be exposed by the computing environment 110 to enable training of the neural networks 112. It should be understood that these examples are illustrative, and therefore should not be construed as being limiting in any way.

When training of the neural networks 112 is completed, the neural networks can have developed the new protocol and/or language for future communications. The neural networks 112 can be distributed to other devices, according to various embodiments of the concepts and technologies disclosed herein, or the computing environment 110 can be used as a go-between for network endpoints. For purposes of simplifying description of the embodiments of the concepts and technologies disclosed herein, the neural networks 112 will be described as being distributed to other devices, but it should be understood from the above description that this embodiment should not be construed as being limiting in any way.

As shown in FIGS. 1A-1B, the operating environment 100 can include a computing device 114, a server computer 116, and a user device 118. According to the example embodiment shown in FIGS. 1A-1B, the computing device 114 can function as a go-between for the user device 118 and the server computer 116. The server computer 116 can host an application 120 that is to be accessed by the user device 118. The application 120 can include any type of application or service that is to be accessed by the user device 118. For purposes of illustrating and describing the concepts and technologies disclosed herein, the application 120 will be described as a callable server application. It should be understood that this example is illustrative, and therefore should not be construed as being limiting in any way.

The functionality of the server computer 116 can be provided by one or more server computers, desktop computers, mobile telephones, laptop computers, smartphones, set-top boxes, gateways, other computing devices, other computing systems, and the like. It should be understood that the functionality of server computer 116 can be provided by a single device, by two or more similar devices, and/or by two or more dissimilar devices. For purposes of describing the concepts and technologies disclosed herein, the server computer 116 is described herein as a server computer. It should be understood that this embodiment is illustrative, and should not be construed as being limiting in any way.

The functionality of the user device 118 can be provided by one or more server computers, desktop computers, mobile telephones, laptop computers, smartphones, set-top boxes, gateways, other computing devices, other computing systems, and the like. It should be understood that the functionality of the user device 118 can be provided by a single device, by two or more similar devices, and/or by two or more dissimilar devices. For purposes of describing the concepts and technologies disclosed herein, the user device 118 is described herein as a personal computer. It should be understood that this embodiment is illustrative, and should not be construed as being limiting in any way.

The computing device 114 can include almost any type of computing device. In various embodiments, the functionality of the computing device 114 can be provided by one or more server computers, desktop computers, mobile telephones, laptop computers, smartphones, set-top boxes, gateways, other computing systems, and the like. It should be understood that the functionality of the computing device 114 can be provided by a single device, by two or more similar devices, and/or by two or more dissimilar devices. For purposes of describing the concepts and technologies disclosed herein, the computing device 114 is described herein as a server computer. It should be understood that this embodiment is illustrative, and should not be construed as being limiting in any way.

The training application 106 can be configured to provide a set of API definitions 122 to the computing device 114. The computing device 114 can store the API definitions 122, and the API definitions 122 can thereby define an API 124 for the computing device 114. The API 124 can enable other devices and/or users such as the user device 118 to call or request functionality from the application 120 via the computing device 114, and the computing device 114 can act as a go-between for the user device 118.

The training application 106 also can be configured to communicate with the computing environment 110, in various embodiments, to deploy the trained neural networks 112 to various devices. In some embodiments, as shown in FIG. 1B, the first neural network 112A can be deployed to the computing device 114, and the second neural network 112B can be deployed to the server computer 116. It should be understood that this example is illustrative, and therefore should not be construed as being limiting in any way. In particular, the neural networks 112 can be deployed, in various embodiments, to the user device 118 and the server computer 116, to the server computer 116 alone, kept on the computing environment 110, and/or otherwise deployed. The choice as to where to deploy the neural networks 112 can be modified by design and/or by request for various purposes.

In some embodiments, for example, it may be determined to be beneficial to avoid sending detectable data (e.g., requests and/or responses in a recognizable language) across certain parts of a network, across certain devices, to or through certain users, combinations thereof, or the like. Thus, some embodiments of the concepts and technologies disclosed herein can allow deployment of neural networks 112 to devices that communicate the requests and responses to convert the requests and/or responses into a custom language, thereby protecting the content of the requests and/or responses from being revealed to devices or users that intercept or otherwise obtain the requests and/or responses in the custom language. Because the neural networks 112 illustrated and described herein can be deployed to any devices for various reasons, it should be understood that this example is illustrative, and therefore should not be construed as being limiting in any way.

As noted above, the computing device 114 can be configured to operate as a go-between for the user device 118. In particular, according to various embodiments of the concepts and technologies disclosed herein, the user device 118 can create or send a request 126 to the computing device 114, for example through the API 124. The request 126 can correspond, in various embodiments, to a request for some action by the application 120. The computing device 114 can be configured to pass the request 126 to the first neural network 112A (which as noted above can be deployed to the computing device 114 in the example embodiment shown in FIG. 1B). The first neural network 112A can translate the request 126 into the custom language developed by the neural networks 112 to obtain a modified request 126'. The modified request 126' can correspond to the request 126, but in the custom language. As noted above, the modified request 126', if intercepted or otherwise obtained by other devices, can be unrecognizable as a request and therefore may appear to be noise or other meaningless data in some embodiments. It should be understood that this example is illustrative, and therefore should not be construed as being limiting in any way. The computing device 114 can provide the modified request 126' to the server computer 116.

The server computer 116 can be configured to receive the modified request 126' and to recognize the received modified request 126' as being formatted in the custom language. The server computer 116 can be configured to pass the modified request 126' to the second neural network 112B (which as noted above can be deployed to the server computer 116 in the example embodiment shown in FIG. 1B). The second neural network 112B can be configured to translate the modified request 126' into an application call that can be recognized by the application 120 and the application call can then be provided to the application 120.

Thus, it can be appreciated that the request 126 received by the computing device 114 can be translated, provided to the server computer 116 as the modified request 126', and then converted into an application call (or converted back into the request 126) at the server computer 116, thereby preventing other devices between the computing device 114 and the server computer 116 from intercepting and/or otherwise obtaining the request 126 in a recognizable format, though without requiring encryption and/or decryption as such. It should be understood that this example is illustrative, and therefore should not be construed as being limiting in any way.

The application 120 can act on the application call (or request 126) and create a response to the request ("response") 128. The response 128 can be output by the application 120 to the second neural network 112B, which can then translate the response 128 into the custom language to create a modified response 128'. The server computer 116 can send, pass, or otherwise provide the modified response 128' to the computing device 114. It can be appreciated that the modified response 128' can be received by the computing device 114 in the custom language from the server computer 116 and then converted at the computing device 114, thereby preventing other devices between the computing device 114 and the server computer 116 from intercepting and/or otherwise obtaining the response 128 in a recognizable format, though without requiring encryption and/or decryption as such. It should be understood that this example is illustrative, and therefore should not be construed as being limiting in any way.

The computing device 114 can translate the modified response 128' from the custom language to a language or protocol that can be understood by the requestor (in the illustrated embodiment, the user device 118). The computing device 114 can provide the response 128 to the user device 118, thereby responding to the request 126. It can be appreciated that the concepts and technologies disclosed herein can enable a user device 118 to make a request 126 and receive a response 128 in one language while communications between the computing device 114 and the server computer 116 can be in the custom language spoken and/or developed by the neural networks 112, thereby reducing the risk of interception and/or other obtaining of the request 126 and/or response 128.

In some embodiments of the concepts and technologies disclosed herein, the requests 126, the responses 128, the modified requests 126', and/or the modified responses 128' can be configured to adjust the custom language during use of the custom language. In particular, the neural networks 112 can be configured to continue developing the custom language after deployment of the neural networks 112, thereby resulting in an evolving language that can be used by the neural networks 112 to protect communications between the computing device 114 and the server computer 116. In some embodiments of the concepts and technologies disclosed herein, the user device 118 or other requestor can host the first neural network 112A and the server computer 116 can host the second neural network 112B. Thus, in some embodiments the request 126 and the response 128 may be known only to the user device 118. Because the neural networks 112 can be deployed in additional and/or alternative configurations, it should be understood that this example is illustrative, and therefore should not be construed as being limiting in any way.

In practice, a training application 106 can pass a set of sample data 108 to a computing environment 110 that stores or hosts two or more neural networks 112. The sample data 108 can correspond to a set of requests 126 and responses 128 and can be used to train the neural networks 112 to create a custom language for communicating with one another to pass information for requests 126 and responses 128. The training application 106 also can send a set of API definitions 122 to a computing device 114 or other device as illustrated and described herein. The computing device 114 can create an API 124 using the API definitions 122, where the API 124 can be called by a requestor (e.g., the user device 118) to create a request for an application 120.

Once trained, the neural networks 112 can be deployed to two or more devices that are to communicate with one another to create a request 126 for the application 120 and to obtain a response 128 from the application 120. In the example embodiment shown in FIGS. 1A-1B, the first neural network 112A can be deployed to a computing device 114 and the second neural network 112B can be deployed to a server computer 116 that can host the application 120. It should be understood that this example is illustrative, and therefore should not be construed as being limiting in any way.

A device (e.g., the user device 118) can create a request 126 via interactions with the API 124 of the computing device 114. The computing device 114 can receive the request 126, translate the request 126 into a custom language developed by the neural networks 112, and pass the modified request 126' to the server computer 116 that hosts the application 120. The server computer 116 can receive the modified request 126', translate the modified request 126' into the request 126 or an equivalent application call using the second neural network 112B, and pass the application call to the application 120.

The application 120 can output a response 128 from the application 120, the response 128 can be translated into the modified response 128' using the second neural network 112B, and the server computer 116 can send the modified response 128' to the computing device 114. The computing device 114 can receive the modified response 128', translate the modified response 128' into the response 128 using the first neural network 112A, and provide the response 128 to the requestor (e.g., the user device 118). Thus, it can be appreciated that the user device 118 can create the request 126 and receive the response 128 without any other devices between the computing device 114 and the server computer 116 obtaining the request 126 and/or the response 128. It should be understood that this example is illustrative, and therefore should not be construed as being limiting in any way.

According to various embodiments of the concepts and technologies disclosed herein, as noted above, the neural networks 112 can be configured to evolve, update, and/or change the custom language developed by the neural networks 112 at any time. In particular, because the neural networks 112 effectively communicate with one another (by the communication of the modified request 126' and the modified responses 128' to one another), these neural networks 112 can continue to evolve their custom language to make understanding the custom language more difficult for the outside observer, interceptor, or other entity that obtains these communications.

In some embodiments, one or more, or each, communication that is based on the custom language (e.g., the modified request 126' and/or the modified response 128') can include data that reflects an update, evolution, or other change to the custom language. Thus, for example, a string of characters at the beginning, middle, end, or other location in the modified request 126' or modified response 128' can be used to embed data that can be understood by the neural networks 112 as changing a structure, format, or other syntax associated with the custom language (and thereby the modified request 126' and the modified response 128'). In some embodiments, these evolutions or changes can be made in each communication by the neural networks 112. In some other embodiments, these evolutions or changes can be made periodically, randomly, at appointed times, and/or at other times and/or under other circumstances. In yet other embodiments, no evolutions or changes may be made to the custom language after training. It should be understood that these examples are illustrative, and therefore should not be construed as being limiting in any way.

Although the foregoing description of FIGS. 1A-1B has discussed primarily the obfuscation of data during movement (e.g., during transmission of data between two endpoints such as the computing device 114 and the server computer 116), it should be understood that embodiments of the concepts and technologies disclosed herein also can be configured to protect data at rest (e.g., during storage). Embodiments of the concepts and technologies disclosed herein also can provide recovery mechanisms for retrieving the machine learning models used by the neural networks 112.

According to various embodiments of the concepts and technologies disclosed herein, the neural networks 112 can be configured to store or generate logs (e.g., machine learning logs) that can detail the development of the custom language or protocol used by the neural networks 112. These machine learning logs or other information can be used if the language used by the neural networks 112 is ever corrupted, lost, or otherwise ceases to function correctly. Thus, the machine learning logs can provide a recovery mechanism that can be used to decipher the modified requests 126' and/or modified responses 128' with or without the neural networks 112, in some embodiments. Furthermore, it can be appreciated that because the neural networks 112 "learn" the custom language (as opposed to being programmed to use the custom language), the custom language can evolve freely and security (obfuscation of the language) can be enhanced relative to other approaches to protecting communications. It should be understood that these examples are illustrative, and therefore should not be construed as being limiting in any way.

FIGS. 1A-1B illustrate one computer 102, one network 104, one computing environment 110, two neural networks 112, one computing device 114, one server computer 116, and one user device 118. It should be understood, however, that various implementations of the operating environment 100 can include zero, one, or more than one computer 102; zero, one, or more than one network 104; zero, one, or more than one computing environment 110; zero, one, two, or more than two neural networks 112; zero, one, or more than one computing device 114; zero, one, or more than one server computer 116; and/or zero, one, or more than one user device 118. As such, the illustrated embodiment should be understood as being illustrative, and should not be construed as being limiting in any way.

Figure 2:
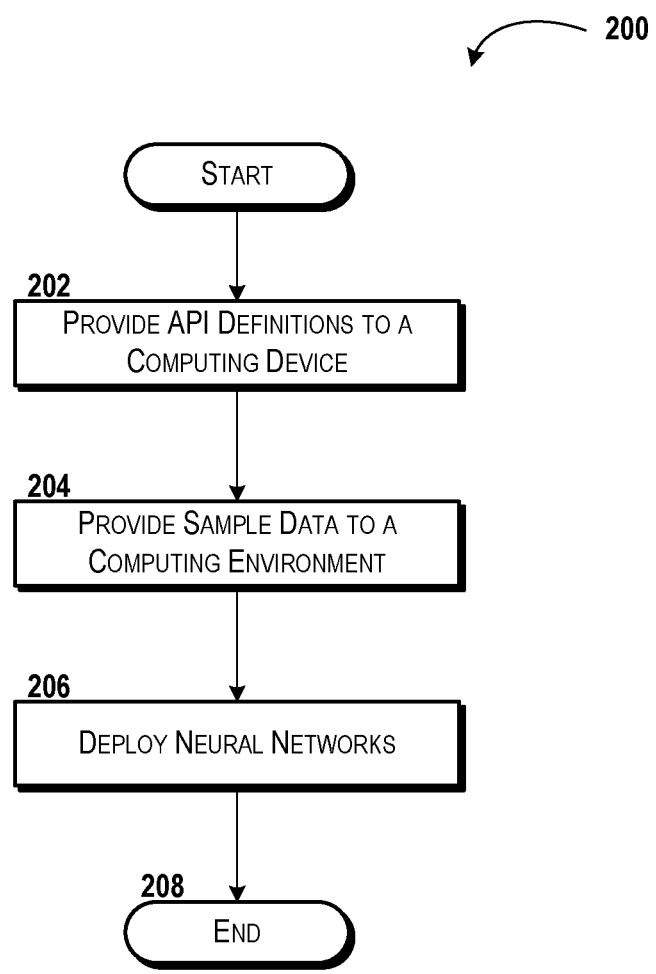
FIG. 2 is a flow diagram showing aspects of a method for training neural networks, according to an illustrative embodiment of the concepts and technologies described herein.

Turning now to FIG. 2, aspects of a method 200 for training neural networks will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computer 102, to perform one or more operations and/or causing the processor to direct other components of the computing system or device to perform one or more of the operations.

For purposes of illustrating and describing the concepts of the present disclosure, the method 200 is described herein as being performed by the computer 102 via execution of one or more software modules such as, for example, the training application 106. It should be understood that additional and/or alternative devices and/or network nodes can provide the functionality described herein via execution of one or more modules, applications, and/or other software including, but not limited to, the training application 106. Thus, the illustrated embodiments are illustrative, and should not be viewed as being limiting in any way.

The method 200 begins at operation 202. At operation 202, the computer 102 can provide API definitions 122 to a computing device 114. The API definitions 122 can define an API 124 that is to be exposed by the computing device 114. As explained above, the computing device 114 can be configured to enable interactions with an application 120 for a device (e.g., the user device 118) that accesses the computing device 114 via the API 124. Thus, the API definitions 122 can define how requests 126 are to be submitted to the computing device 114, a format for the requests 126, how the requests 126 will be translated and/or operated on by the first neural network 112A, how communications with the application 120 will be conducted, and how responses 128 will be provided to requestors. Thus, the API definitions 122 can define how the API 124 will operate and/or how communications via the API 124 will be communicated to the server computer 116. It should be understood that this example is illustrative, and therefore should not be construed as being limiting in any way.

From operation 202, the method 200 can proceed to operation 204. At operation 204, the computer 102 can provide sample data 108 to a computing environment such as the computing environment 110. The sample data 108 can be provided to any device(s) or environment(s) that can host or store one or more of the two neural networks 112 illustrated and described herein. The sample data 108 can be used to train the neural networks 112. As noted above, the neural networks 112 can be trained to create a custom language and/or protocol that can be used to communicate between the neural networks 112. Thus, the neural networks 112 can be configured to train themselves using the sample data 108 in response to receiving the sample data 108.

In some embodiments of the concepts and technologies disclosed herein, the computer 102 can send the sample data 108 with instructions for the neural networks 112, wherein the neural networks 112 can be configured to perform deep learning on the sample data 108 in response to receiving the sample data 108 and/or in response to receiving the instructions. Thus, although not shown in FIG. 2, it can be appreciated that the computer 102 can determine that the neural networks 112 have been trained at some period in time. Thus, some embodiments of operation 204 can include the computer 102 determining that training has been completed. It should be understood that this example is illustrative, and therefore should not be construed as being limiting in any way.

According to various embodiments of the concepts and technologies disclosed herein, the sample data 108 can correspond to and/or can include one or more models and/or other information that can be used to train other devices and/or networks, as will be explained in more detail herein. In some embodiments, the sample data 108 can include requests and/or responses for an application (e.g., the application 120) that is to be protected using the custom language. Thus, for example, the sample data 108 can include any number of request or responses and therefor can be analyzed to determine a structure of requests and/or responses for the application 120. It should be understood that this example is illustrative, and therefore should not be construed as being limiting in any way.

According to some embodiments, the sample data 108 also can include an initialization vector to other data that can be used by the neural networks 112 to further obscure the to-be-developed language or protocol. Thus, training of the neural networks 112 can include application of the initialization vector or other data to modify the protocol or custom language using some data other than just the structure of requests and/or responses. It should be understood that this example is illustrative, and therefore should not be construed as being limiting in any way.

From operation 204, the method 200 can proceed to operation 206. At operation 206, the computer 102 can deploy the neural networks 112. It can be appreciated from the above description of operation 204 that the neural networks 112 can be deployed by the computer 102 after the training illustrated and described in operation 204. The trained neural networks 112 can be deployed to one or more devices, networks, or environments. In some embodiments, a first neural network 112A can be deployed to a first endpoint (e.g., the user device 118) and a second neural network 112B can be deployed to a second endpoint (e.g., the server computer 116 that hosts the application 120). It can be appreciated that by deploying the neural networks 112 to endpoints, the deployment of the neural networks 112 can effectively protect communications between those endpoints (e.g., by obfuscating communications between the neural networks 112 and the endpoints). It should be understood that this example is illustrative, and therefore should not be construed as being limiting in any way.

In the embodiment illustrated and described in FIGS. 1A-1B, the first neural network 112A can be deployed to the computing device 114 and the second neural network 112B can be deployed to the server computer 116. It should be understood that this example is illustrative, and therefore should not be construed as being limiting in any way.

As noted above, the choice as to where to deploy the neural networks 112 can be based on various considerations such as, for example, where the endpoints are located in a network, where the communication paths between the endpoints are located and/or through which they traverse (e.g., do the communication paths expose data to certain networks, certain devices, certain users, etc.), where data associated with the requests 126 and/or responses 128 should be obfuscated, combinations thereof, or the like. The determination as to where to deploy the neural networks 112 can be a design choice, can be set my users and/or operators, and/or can be automatically determined in various embodiments. Though not separately shown in FIG. 2, an operation for determining placement of the neural networks 112 can be performed. It should be understood that this example is illustrative, and therefore should not be construed as being limiting in any way.

Operation 206 can correspond to the computer 102 issuing commands to deploy the neural networks 112 to the desired target devices. Any number of devices can be involved in deploying the neural networks 112. In some example embodiments, the computing device 114 can obtain the first neural network 112A and the server computer 116 can obtain the second neural network 112B. It should be understood that this example is illustrative, and therefore should not be construed as being limiting in any way.

From operation 206, the method 200 can proceed to operation 208. The method 200 can end at operation 208.

Figure 3:
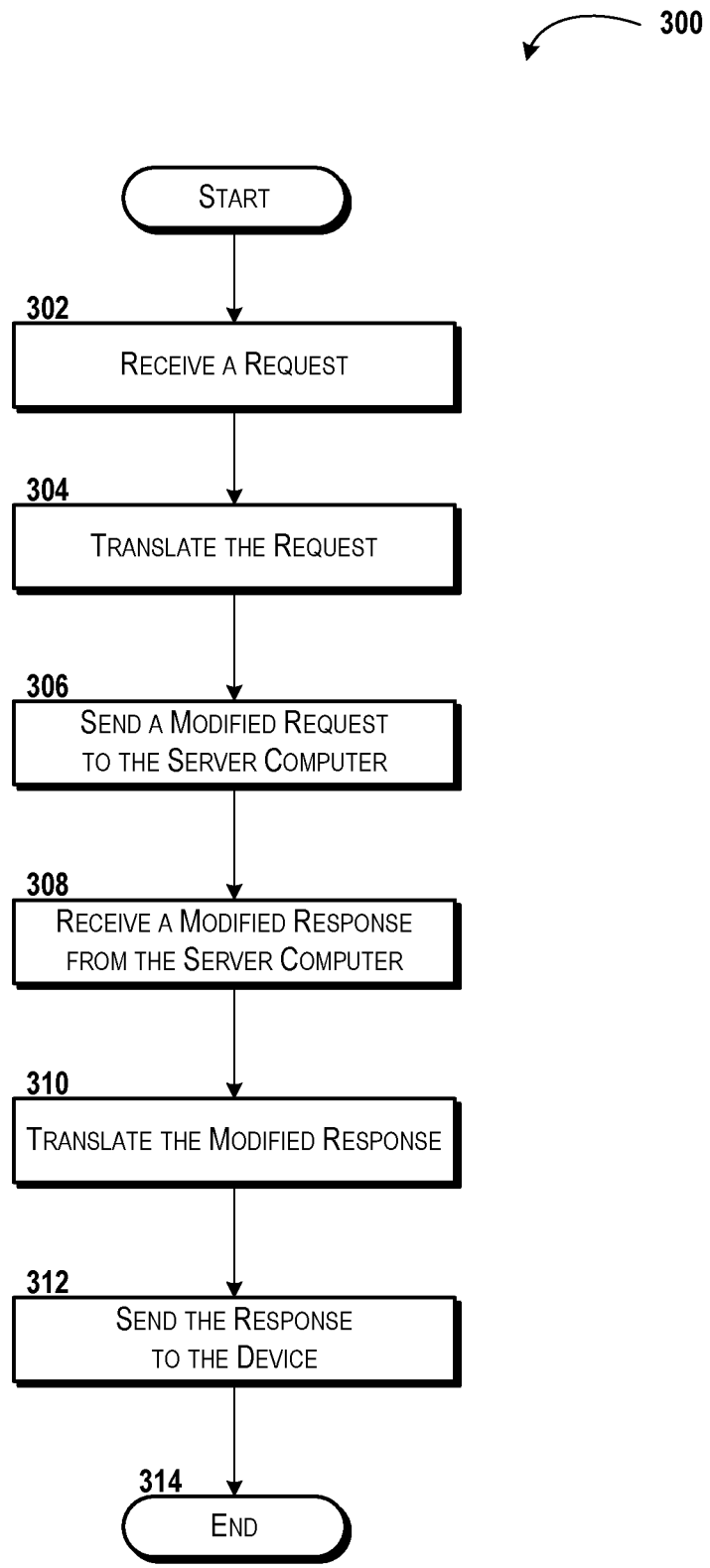
FIG. 3 is a flow diagram showing aspects of a method for creating an application call using a custom language, according to an illustrative embodiment of the concepts and technologies described herein.

Turning now to FIG. 3, aspects of a method 300 for creating an application call using a custom language will be described in detail, according to an illustrative embodiment. For purposes of illustrating and describing the concepts of the present disclosure, the method 300 is described herein as being performed by the computing device 114 via execution of one or more software modules such as, for example, the API 124, the first neural network 112A, and/or the second neural network 112B. It should be understood that additional and/or alternative devices and/or network nodes can provide the functionality described herein via execution of one or more modules, applications, and/or other software including, but not limited to, the API 124, the first neural network 112A, and/or the second neural network 112B. Thus, the illustrated embodiments are illustrative, and should not be viewed as being limiting in any way.

The method 300 begins at operation 302. At operation 302, the computing device 114 can receive a request such as the request 126 shown in FIGS. 1A-1B. The request 126 received in operation 302 can include, according to various embodiments of concepts and technologies disclosed herein, a request for some action by the application 120. This request can correspond to an application request, e.g., a request for an operation to be performed by the application 120. Thus, it can be appreciated that a requestor (e.g., the user device 118 shown in FIGS. 1A-1B) can request an action from the application 120 via interactions with the API 124 of the computing device 114.

It can be appreciated that from the perspective of the requestor (e.g., the user device 118 in FIGS. 1A-1B), the request for the application 120 can be made via the API 124. In other words, in some embodiments of the concepts and technologies disclosed herein, the location of the application 120 can be obfuscated from the user device 118 and/or other entities, and requests made of the application 120 can be made through the API 124 without the requestor being aware that the application 120 is located elsewhere. Such an approach can further enhance security, in some embodiments. It should be understood that this example is illustrative, and therefore should not be construed as being limiting in any way.

The computing device 114 can be configured to act as a go-between for the user device 118 and the server computer 116 that hosts the application 120, where the submission of the request 126 to the API 124 by the user device 118 and the receipt of a response 128 from the API 124 by the user device 118 can appear seamless from the perspective of the user device 118 (e.g., from the perspective of the user device 118, the application 120 can appear to be hosted by the computing device 114). Thus, some embodiments of the concepts and technologies disclosed herein can obfuscate communications by using the custom language, and can be configured to obfuscate the location of the application 120 by acting as a go-between for the application 120 and a requestor using the API 124. It should be understood that this example is illustrative, and therefore should not be construed as being limiting in any way.

From operation 302, the method 300 can proceed to operation 304. At operation 304, the computing device 114 can translate the request 126 obtained in operation 302. In various embodiments, for example, the computing device 114 can translate the request 126 received in operation 304 to obtain the modified request 126'. In various embodiments, the computing device 114 can pass the request 126 to the first neural network 112A, and the first neural network 112A can translate the request 126 to obtain the modified request 126' in the custom language. The modified request 126' can correspond to the request 126, but in the custom language. Thus, as explained herein, the modified request 126', if intercepted or otherwise obtained by other devices when being transferred from the computing device 114 to the application 120, can be unrecognizable as a request and therefore may appear to be noise or other meaningless data in some embodiments. It should be understood that this example is illustrative, and therefore should not be construed as being limiting in any way.

From operation 304, the method 300 can proceed to operation 306. At operation 306, the computing device 114 can send a modified request 126' to the server computer 116 or other device or network that can host the application 120 being interacted with via the computing device 114. According to various embodiments of the concepts and technologies disclosed herein, the server computer 116 (or other device that hosts the application 120) can interface with the computing device 114 via the API 124.

Thus, the API 124 can be configured to enable the transmission of the modified request 126' to the application 120. The communication channel between the computing device 114 and the server computer 116 can be secured, in various embodiments, and also the providing of the modified request 126' in the custom language can enable enhanced security and/or obfuscation of the request 126 as the custom language can render the modified request 126' meaningless to any device that intercepts or otherwise obtains the modified request 126'. It should be understood that this example is illustrative, and therefore should not be construed as being limiting in any way.

From operation 306, the method 300 can proceed to operation 308. At operation 308, the computing device 114 can receive a response from the server computer 116, for example the modified response 128' shown in FIGS. 1A-1B. As explained above, it can be appreciated that the modified response 128' received by the computing device 114 in operation 308 can be formatted in the custom language developed by the neural networks 112. Thus, the modified response 128' can be transmitted to the computing device 114 by the server computer 116 such that other devices between the computing device 114 and the server computer 116 that intercept or otherwise obtain the modified response 128' may be unaware of the contents of the response from the application 120.

It therefore can be appreciated that the modified response 128' can obfuscate the communications from the application 120 in a manner that can be similar to the manner in which the modified request 126' obfuscated the communications to the application 120. It can be appreciated that by employing embodiments of the concepts and technologies disclosed herein, the neural networks 112 can effectively communicate with each other in the custom language, though the neural networks 112 can be located at geographically remote locations in some embodiments. It should be understood that this example is illustrative, and therefore should not be construed as being limiting in any way.

From operation 308, the method 300 can proceed to operation 310. At operation 310, the computing device 114 can translate the response received in operation 308. In various embodiments, for example, the computing device 114 can translate the modified response 128' received in operation 308 to obtain the response 128. In various embodiments, the computing device 114 can pass the modified response 128' (which can be formatted in the custom language) to the first neural network 112A, and the first neural network 112A can translate the modified response 128' to obtain the response 128. It should be understood that this example is illustrative, and therefore should not be construed as being limiting in any way.

From operation 310, the method 300 can proceed to operation 312. At operation 312, the computing device 114 can send the response 128 to a device such as the device from which the request 126 was received in operation 302. In the embodiment shown in FIGS. 1A-1B, for example, the request 126 can be received in operation 302 from the user device 118, and the response 128 can be provided, in operation 312, to the user device 118. It should be understood that this example is illustrative, and therefore should not be construed as being limiting in any way.

From operation 312, the method 300 can proceed to operation 314. The method 300 can end at operation 314.

Figure 4:
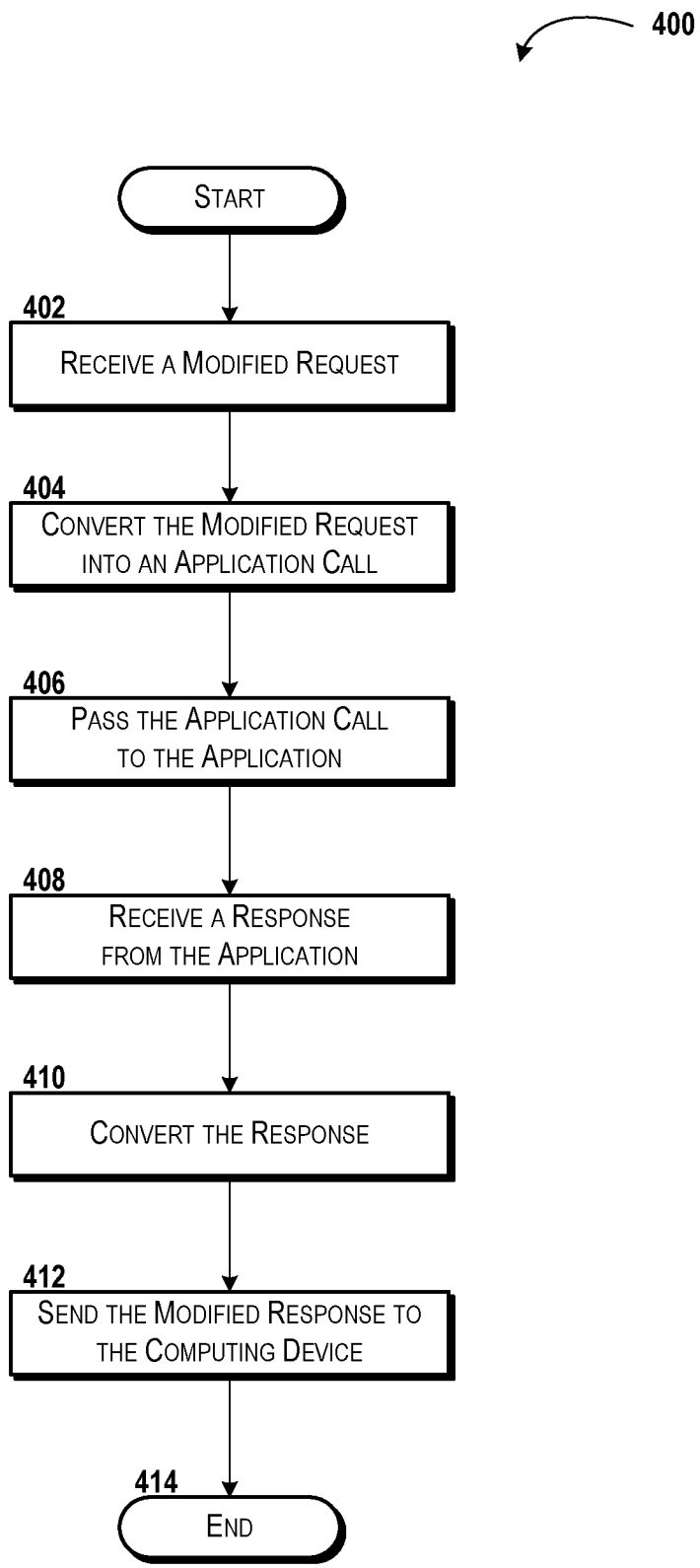
FIG. 4 is a flow diagram showing aspects of a method for providing a response using a custom language, according to an illustrative embodiment of the concepts and technologies described herein.

Turning now to FIG. 4, aspects of a method 400 for providing a response using a custom language will be described in detail, according to an illustrative embodiment. For purposes of illustrating and describing the concepts of the present disclosure, the method 400 is described herein as being performed by the server computer 116 via execution of one or more software modules such as, for example, the application 120 and/or the second neural network 112B. It should be understood that additional and/or alternative devices and/or network nodes can provide the functionality described herein via execution of one or more modules, applications, and/or other software including, but not limited to, the application 120 and/or the second neural network 112B. Thus, the illustrated embodiments are illustrative, and should not be viewed as being limiting in any way.

The method 400 begins at operation 402. At operation 402, the server computer 116 can receive a request such as the modified request 126'. It can be appreciated that the modified request 126' received in operation 402 can correspond to the modified request 126' sent in operation 306 of the method 300 illustrated and described with reference to FIG. 3. It should be understood that this example is illustrative, and therefore should not be construed as being limiting in any way. The modified request 126' can correspond to an application request, but can be formatted in the custom language developed by the neural networks 112, in various embodiments.

From operation 402, the method 400 can proceed to operation 404. At operation 404, the server computer 116 can convert the modified request 126' obtained in operation 402 into an application call that can be understood by the application 120. In various embodiments of the concepts and technologies disclosed herein, the server computer 116 can pass the modified request 126' obtained in operation 402 to the second neural network 112B, and the second neural network 112B can convert the modified request 126' (in the custom language) into an application call that can be understood by the application 120. It should be understood that this example is illustrative, and therefore should not be construed as being limiting in any way.

From operation 404, the method 400 can proceed to operation 406. At operation 406, the server computer 116 can pass the application call to the application 120. From operation 406, the method 400 can proceed to operation 408. At operation 408, the server computer 116 can receive a response from the application 120, for example the response 128. The response 128 can be formatted in a particular language, protocol, or format, other than the custom language spoken and/or used by the neural networks 112.

From operation 408, the method 400 can proceed to operation 410. In operation 410, the server computer 116 can pass the response 128 to the second neural network 112B and the second neural network 112B can convert the response 128 into the modified response 128'. It can be appreciated that the modified response 128' obtained in operation 410 can be similar to the response 128 obtained in operation 408, but the modified response 128' can be formatted in the custom language.

From operation 410, the method 400 can proceed to operation 412. At operation 412, the server computer 116 can send the modified response 128' to the computing device 114. It can be appreciated that the sending of the modified response 128' in operation 412 can correspond to the receiving of the modified response 128' in operation 308 of the method 300 shown in FIG. 3. It should be understood that this example is illustrative, and therefore should not be construed as being limiting in any way.

From operation 412, the method 400 can proceed to operation 414. The method 400 can end at operation 414.

Figure 5:
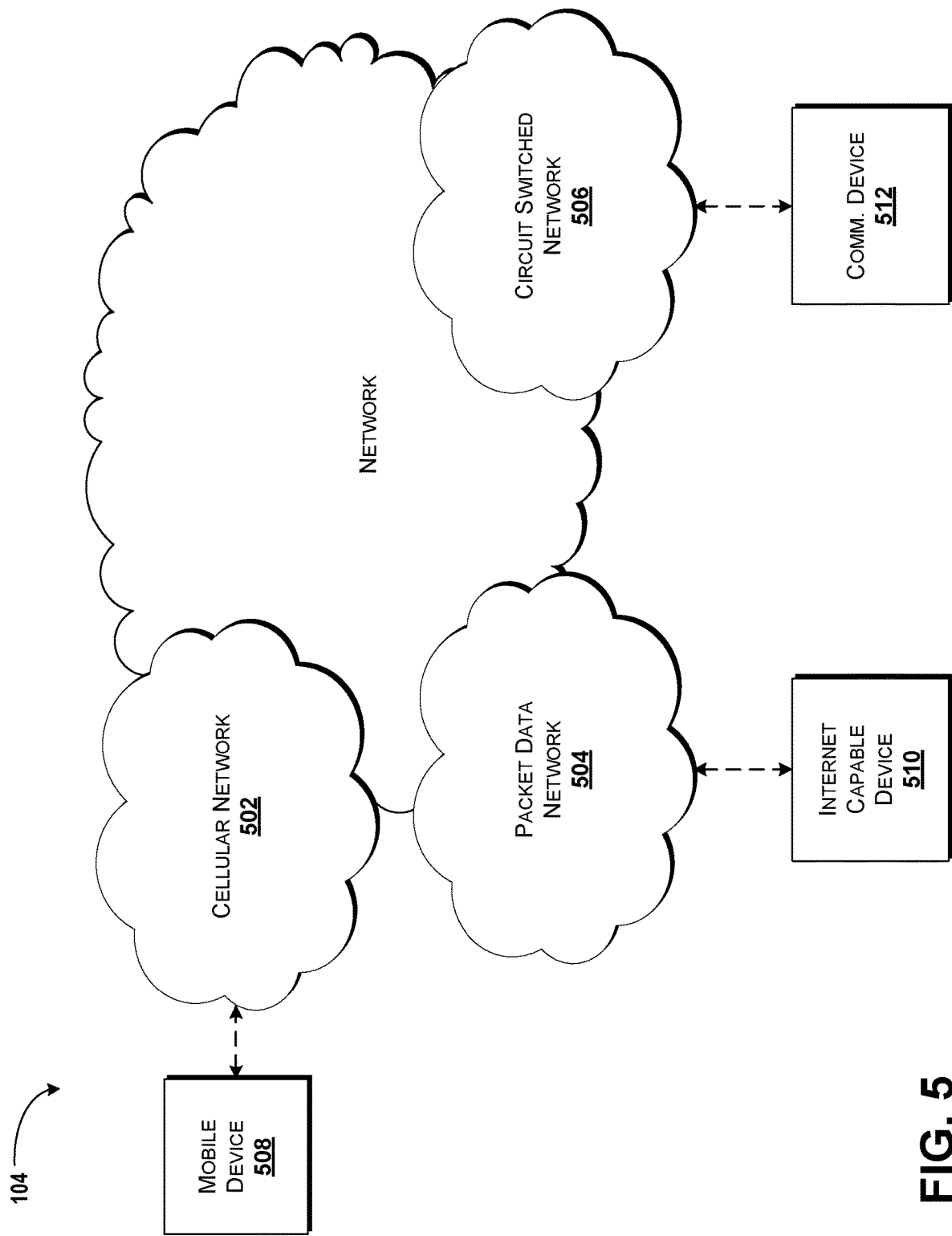
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the cellular network 502, the packet data network 504, the circuit switched network 506, and/or other networks. It should be appreciated that substantially all of the functionality described with reference to the network 104 can be performed by the cellular network 502, the packet data network 504, and/or the circuit switched network 506, alone or in combination with other networks, network elements, and the like.

Figure 6:
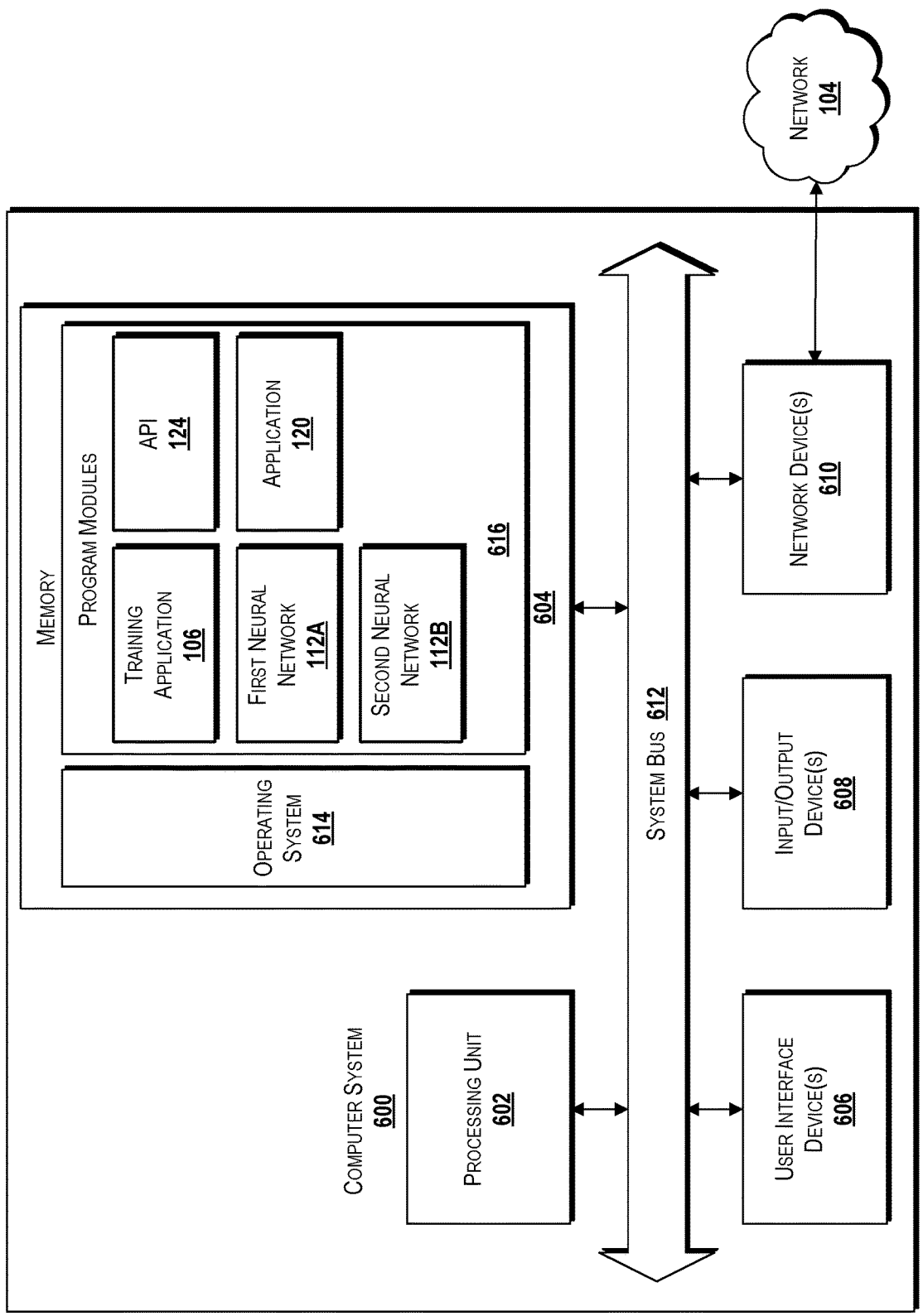
FIG. 6 is a block diagram illustrating an example computer system configured to use deep learning models to obfuscate and optimize communications, according to some illustrative embodiments of the concepts and technologies described herein.

FIG. 6 is a block diagram illustrating a computer system 600 configured to provide the functionality described herein for using deep learning models to obfuscate and optimize communications, in accordance with various embodiments of the concepts and technologies disclosed herein. The computer system 600 includes a processing unit 602, a memory 604, one or more user interface devices 606, one or more input/output devices (hereinafter collectively and/or generically referred to as I/O devices 608), and one or more network devices 610, each of which is operatively connected to a system bus 612. The system bus 612 can enable bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the training application 106, the neural networks 112, the application 120, and/or other applications or programs. These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the sample data 108, the API definitions 122, the requests 126, the modified requests 126', the responses 128, the modified responses 128', and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
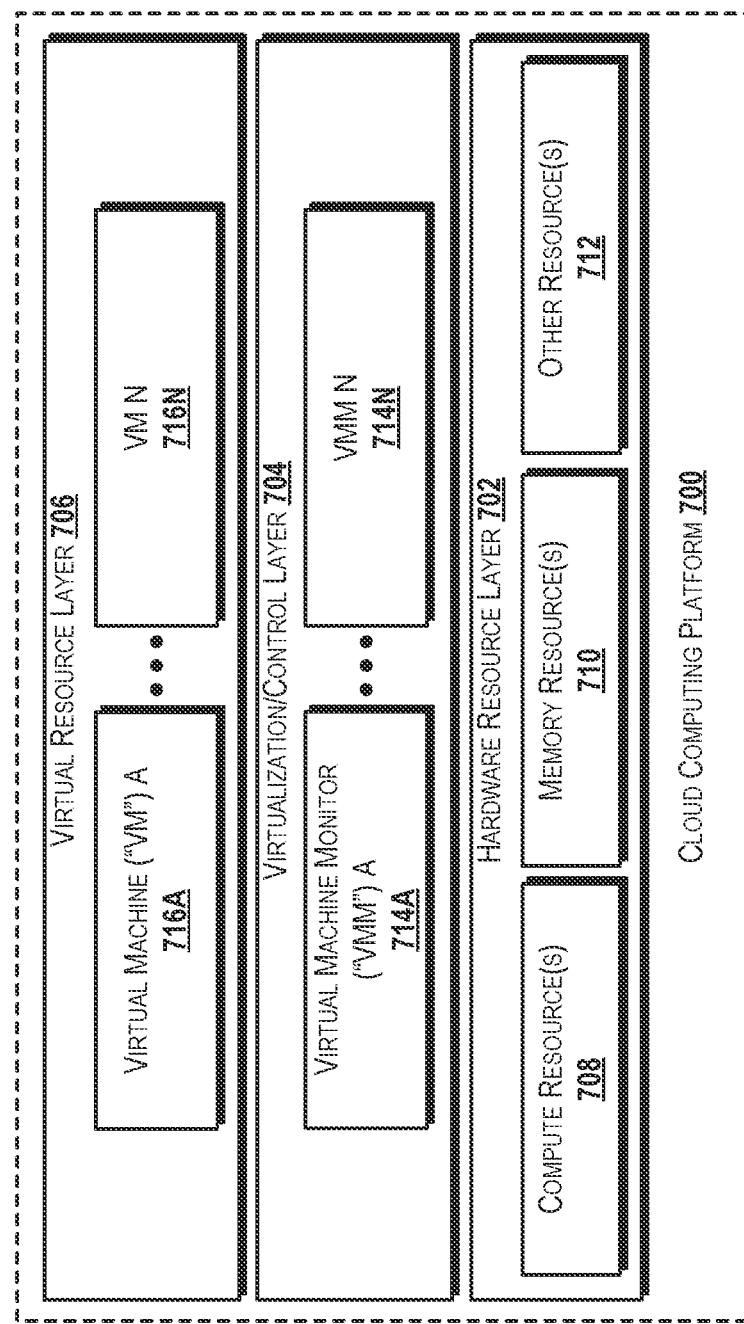
FIG. 7 is a diagram illustrating a computing environment capable of implementing aspects of the concepts and technologies disclosed herein, according to some illustrative embodiments of the concepts and technologies described herein.

FIG. 7 illustrates a cloud computing platform architecture 700 according to one example embodiment of the concepts and technologies disclosed herein. The cloud computing platform architecture 700 can be capable of executing the software components described herein for using deep learning models to obfuscate and optimize communications, as well as the various disclosures herein for interacting with the computer 102, the training application 106, the neural networks 112, computing device 114, the server computer 116, the application 120, the computing environment 110, the user device 118, and/or other applications, services, and/or devices as disclosed herein. Thus, it can be appreciated that in some embodiments of the concepts and technologies disclosed herein, the cloud computing platform architecture 700 illustrated in FIG. 7 can be used to provide the functionality described herein with respect to the computer 102, the computing device 114, the computing environment 110, the server computer 116, the user device 118, and/or other devices illustrated and described herein.

The cloud computing platform architecture 700 thus may be utilized to execute any aspects of the software components presented herein. Thus, according to various embodiments of the concepts and technologies disclosed herein, the training application 106, the neural networks 112, the API 124, and/or other functionality can be implemented, at least in part, on or by elements included in the cloud computing platform architecture 700 illustrated and described herein. Those skilled in the art will appreciate that the cloud computing platform architecture 700 is a simplification of only one possible implementation of an illustrative cloud computing platform, and as such, the cloud computing platform architecture 700 should not be construed as being limiting in any way.

In the illustrated embodiment, the cloud computing platform architecture 700 can include a hardware resource layer 702, a virtualization/control layer 704, and a virtual resource layer 706. These layers and/or other layers can be configured to cooperate with each other and/or other elements of a cloud computing platform architecture to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 706 can include one or more hardware components that can perform computations to process data, and/or to execute computer-executable instructions of one or more application programs, operating systems, services, and/or other software including, but not limited to, the training application 106, the neural networks 112, the application 120, and/or other programs or applications illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, Calif., and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the training application 106, the neural networks 112, the application 120, or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the sample data 108, the neural networks 112, the API definitions 122, the requests 126, the modified requests 126', the responses 128, the modified responses 128', and/or other data, if desired. It should be understood that this example is illustrative, and therefore should not be construed as being limiting in any way.

The other resource(s) 712 can include any other hardware resources that can be utilized by the compute resources(s) 706 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for using deep learning models to obfuscate and optimize communications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
receiving, at a first computing device that stores a first neural network, a request for an operation to be performed by an application that is executed by a second computing device, wherein the request is in a first language, and wherein the request is received from a user device,
translating, at the first computing device and using the first neural network, the request into a modified request in a custom language, wherein the first neural network and a second neural network are trained to communicate with one another in the custom language, and wherein the custom language is created by the first neural network and the second neural network,
sending, by the first computing device and to the second computing device, the modified request in the custom language,
receiving, by the first computing device and from the second computing device, a modified response that is in the custom language, wherein the modified response is created at the second computing device using the second neural network,
translating, by the first computing device and using the first neural network, the modified response into a response in the first language, and
sending, by the first computing device and to the user device, the response in the first language, wherein the first neural network and the second neural network create the custom language using sample data provided by a training application, wherein the sample data comprises requests and responses associated with the application, and wherein the first neural network and the second neural network create the custom language based on a structure of the requests and the responses, wherein the first neural network is deployed to the first computing device after the first neural network is trained to communicate using the custom language, and wherein the second neural network is deployed to the second computing device after the second neural network is trained to communicate using the custom language.

2. The system of claim 1, wherein the request for the operation is received via an application programming interface that is exposed by the first computing device.

3. The system of claim 2, wherein the modified request is sent to the second computing device via the application programming interface.

4. The system of claim 1, wherein the request for the operation is received via an application programming interface that is exposed by the first computing device.

5. The system of claim 4, wherein the training application provides a set of application programming interface definitions to the first computing device.

6. The system of claim 5, wherein the application programming interface is based on the application programming interface definitions.

7. The system of claim 1, wherein the second computing device receives the modified request, translates the modified request into an application call using the second neural network, passes the application call to the application, receives an application response from the application, and translates the application response into the modified response using the second neural network.

8. The system of claim 1, wherein the modified request and the modified response obfuscate contents of the request for the operation and contents of the response.

9. A method comprising:
receiving, at a first computing device that stores a first neural network, a request for an operation to be performed by an application that is executed by a second computing device, wherein the request is in a first language, and wherein the request is received from a user device;
translating, at the first computing device and using the first neural network, the request into a modified request in a custom language, wherein the first neural network and a second neural network are trained to communicate with one another in the custom language, and wherein the custom language is created by the first neural network and the second neural network;
sending, by the first computing device and to the second computing device, the modified request in the custom language;
receiving, by the first computing device and from the second computing device, a modified response that is in the custom language, wherein the modified response is created at the second computing device using the second neural network;
translating, by the first computing device and using the first neural network, the modified response into a response in the first language; and
sending, by the first computing device and to the user device, the response in the first language, wherein the first neural network and the second neural network create the custom language using sample data provided by a training application, wherein the sample data comprises requests and responses associated with the application, and wherein the first neural network and the second neural network create the custom language based on a structure of the requests and the responses, wherein the first neural network is deployed to the first computing device after the first neural network is trained to communicate using the custom language, and wherein the second neural network is deployed to the second computing device after the second neural network is trained to communicate using the custom language.

10. The method of claim 9, wherein the request for the operation is received via an application programming interface that is exposed by the first computing device.

11. The method of claim 10, wherein the request training application provides a set of application programming interface definitions to the first computing device.

12. The method of claim 11, wherein the application programming interface is based on the application programming interface definitions.

13. The method of claim 9, wherein the second computing device receives the modified request, translates the modified request into an application call using the second neural network, passes the application call to the application, receives an application response from the application, and translates the application response into the modified response using the second neural network.

14. A computer storage medium having computer-executable instructions stored thereon that, when executed by a processor, cause the processor to perform operations comprising:
receiving, at a first computing device that stores a first neural network, a request for an operation to be performed by an application that is executed by a second computing device, wherein the request is in a first language, and wherein the request is received from a user device;
translating, at the first computing device and using the first neural network, the request into a modified request in a custom language, wherein the first neural network and a second neural network are trained to communicate with one another in the custom language, and wherein the custom language is created by the first neural network and the second neural network;
sending, by the first computing device and to the second computing device, the modified request in the custom language;
receiving, by the first computing device and from the second computing device, a modified response that is in the custom language, wherein the modified response is created at the second computing device using the second neural network;
translating, by the first computing device and using the first neural network, the modified response into a response in the first language; and
sending, by the first computing device and to the user device, the response in the first language, wherein the first neural network and the second neural network create the custom language using sample data provided by a training application, wherein the sample data comprises requests and responses associated with the application, and wherein the first neural network and the second neural network create the custom language based on a structure of the requests and the responses, wherein the first neural network is deployed to the first computing device after the first neural network is trained to communicate using the custom language, and wherein the second neural network is deployed to the second computing device after the second neural network is trained to communicate using the custom language.

15. The computer storage medium of claim 14, wherein the request for the operation is received via an application programming interface that is exposed by the first computing device.

16. The computer storage medium of claim 14, wherein the request for the operation is received via an application programming interface that is exposed by the first computing device.

17. The computer storage medium of claim 16, wherein the training application provides a set of application programming interface definitions to the first computing device.

18. The computer storage medium of claim 17, wherein the application programming interface is based on the application programming interface definitions.

19. The computer storage medium of claim 14, wherein the second computing device receives the modified request, translates the modified request into an application call using the second neural network, passes the application call to the application, receives an application response from the application, and translates the application response into the modified response using the second neural network.

20. The computer storage medium of claim 14, wherein one of the modified request or the modified response comprises data that communicates a change in the custom language.

\* \* \* \* \*